W. E. CRANE.
FOLDING, WRAPPING, AND ADDRESSING MACHINE.
APPLICATION FILED OCT. 31, 1892.
995,327.
Patented June 13, 1911.
10 SHEETS—SHEET 5.
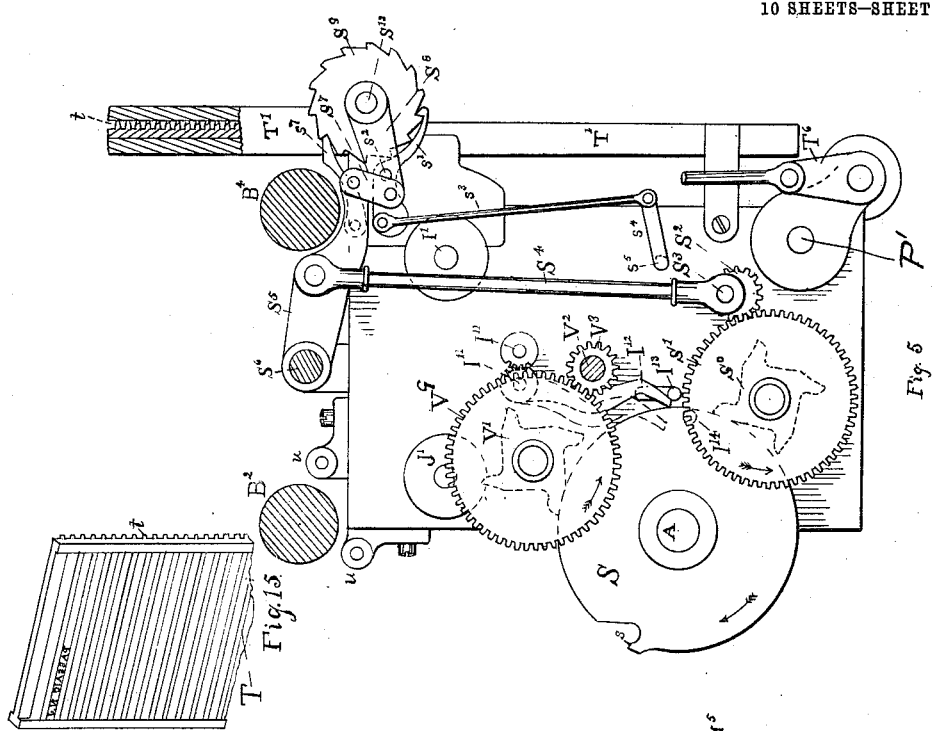
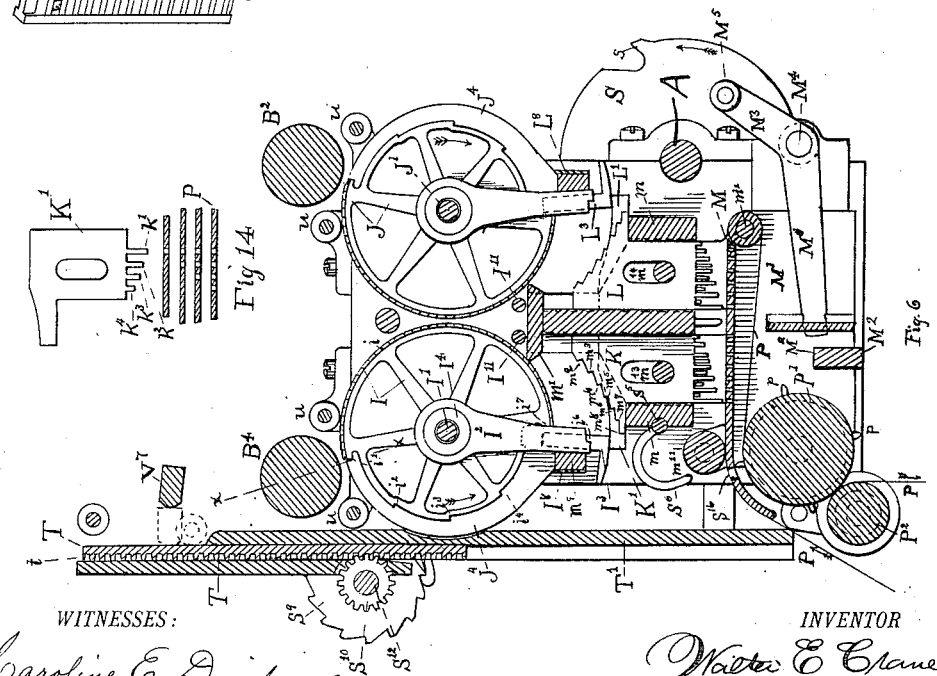
WITNESSES:
Caroline E. Davidson
Jessie B. Kay
INVENTOR
Walter E. Crane
BY
Franklin L. Pope
ATTORNEY W. E. CRANE.
FOLDING, WRAPPING, AND ADDRESSING MACHINE.
APPLICATION FILED OCT. 31, 1892.

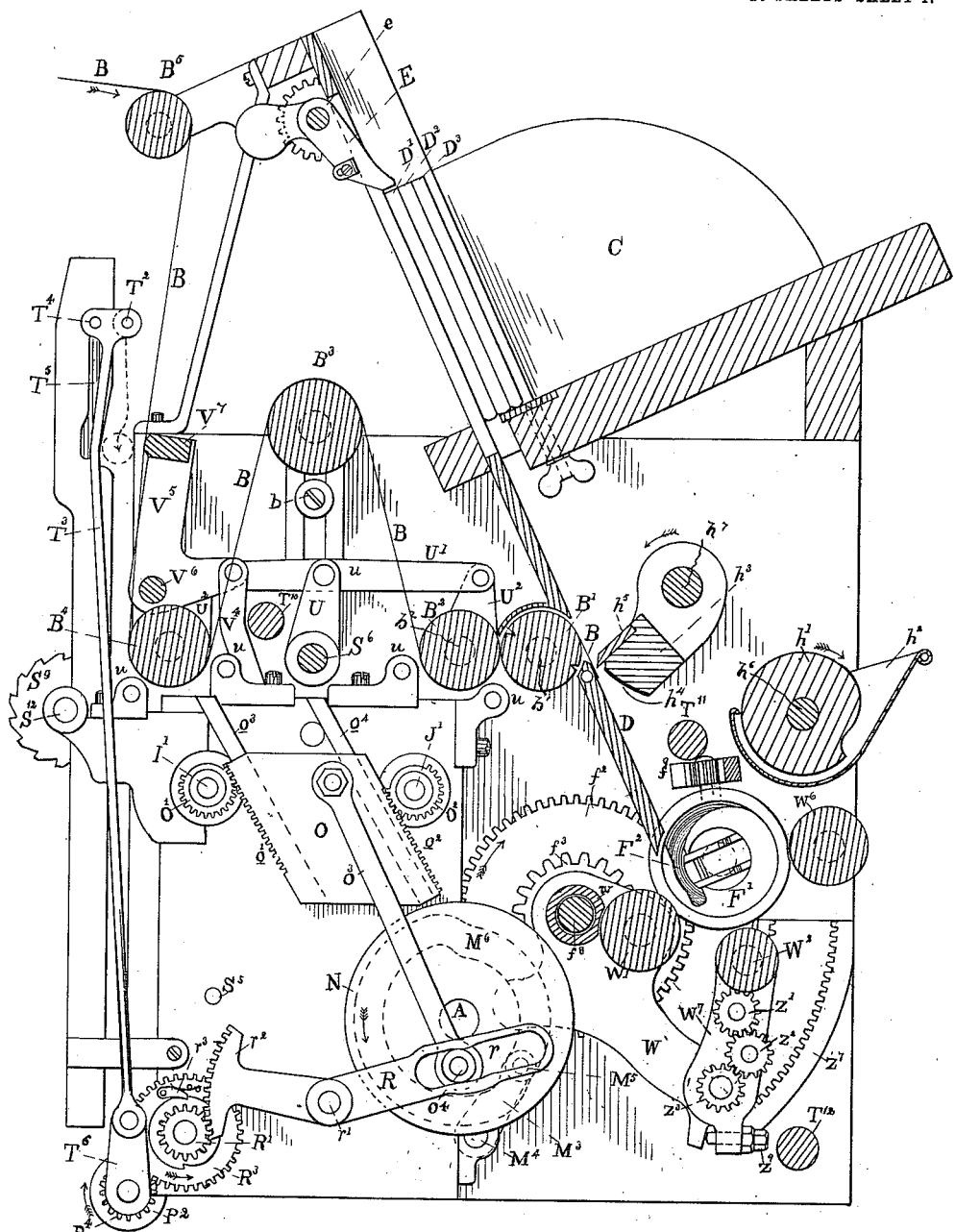

995,327.

Patented June 13, 1911.
10 SHEETS—SHEET 6.

WITNESSES:
Caroline E. Davidson
Jessie B. Kay

INVENTOR
Walter E. Crane
BY
Franklin L. Pope
ATTORNEY

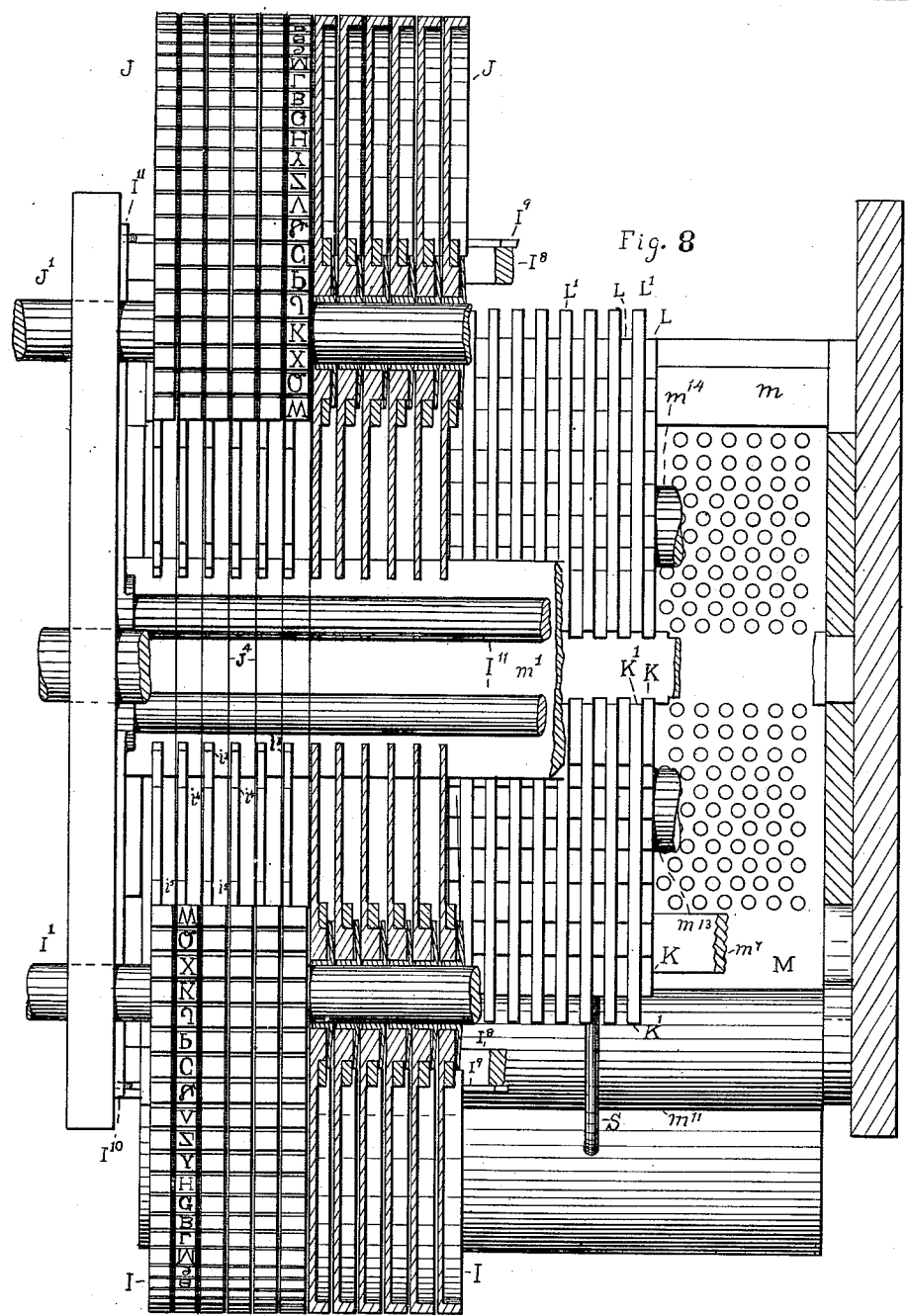

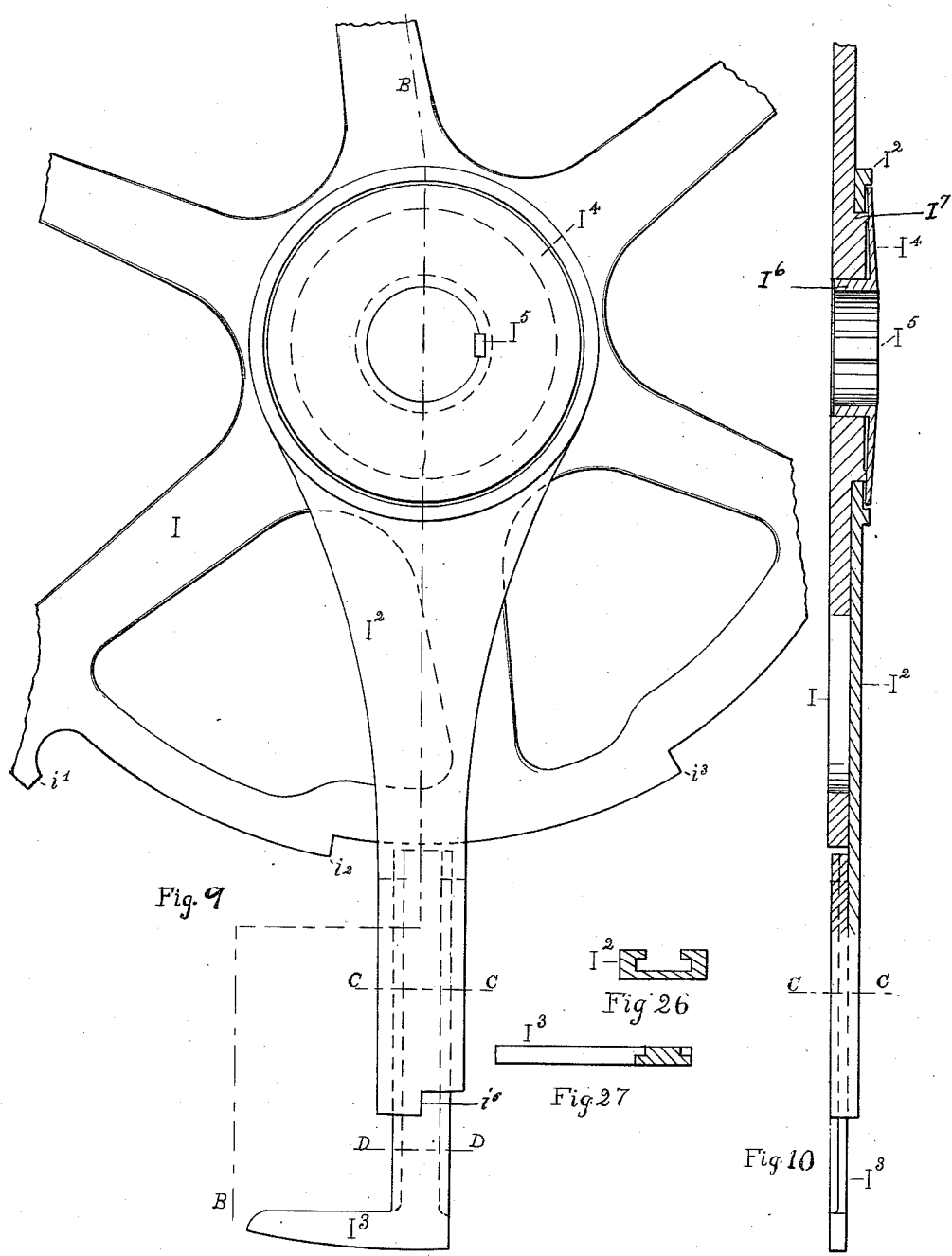

W. E. CRANE.
FOLDING, WRAPPING, AND ADDRESSING MACHINE.
APPLICATION FILED OCT. 31, 1892.

995,327.

Patented June 13, 1911.
10 SHEETS—SHEET 9.

WITNESSES:
Caroline E. Davidson
Jessie B. Kay

INVENTOR
Walter E. Crane
BY
Franklin L. Pope
ATTORNEY

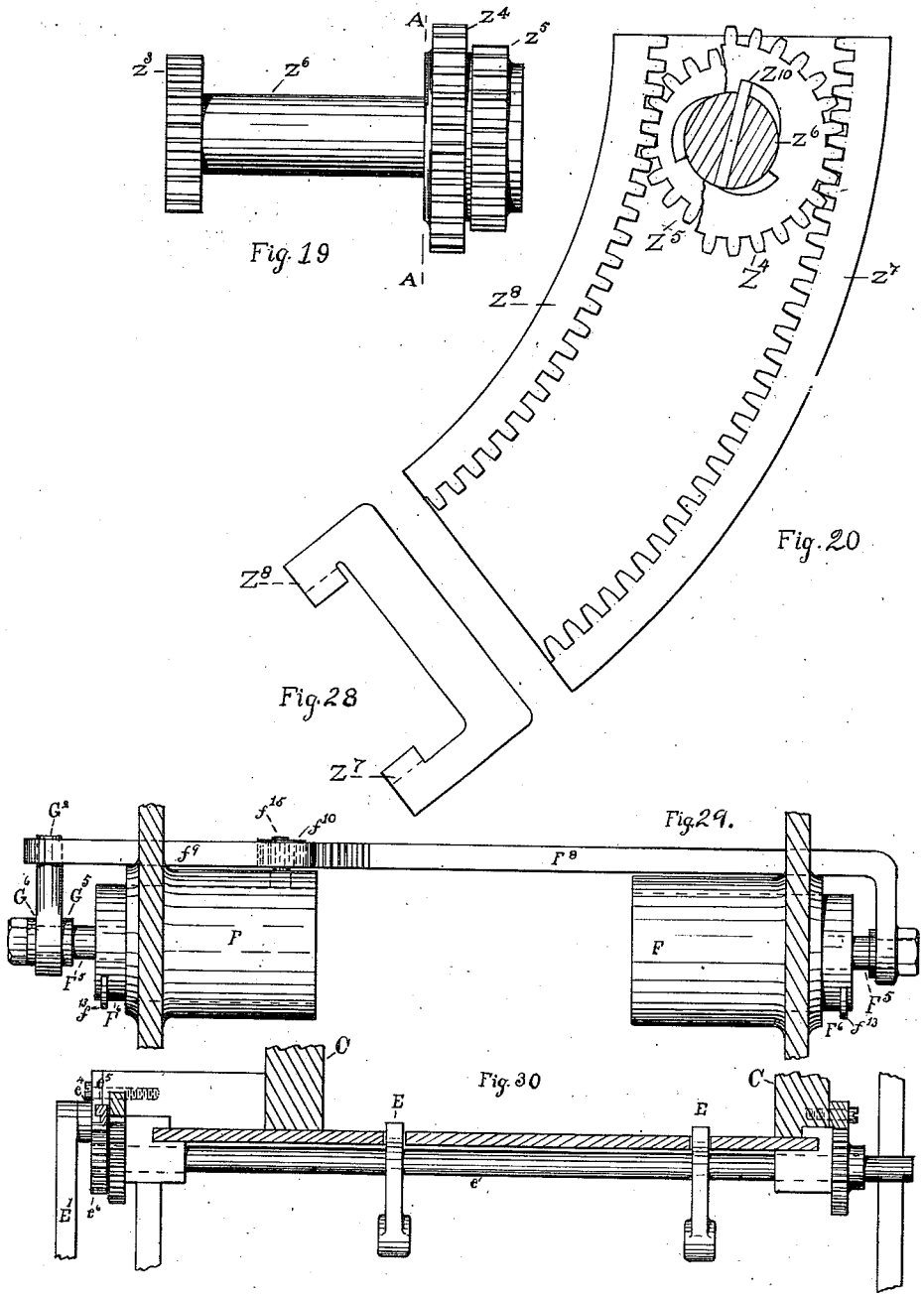

UNITED STATES PATENT OFFICE.

WALTER ELIPHALET CRANE, OF HARTFORD, CONNECTICUT, ASSIGNOR, BY MESNE ASSIGNMENTS, TO POLLARD-ALLING MANUFACTURING COMPANY, A CORPORATION OF NEW YORK.

FOLDING, WRAPPING, AND ADDRESSING MACHINE.

995,327.  Specification of Letters Patent.  Patented June 13, 1911.

Application filed October 31, 1892. Serial No. 450,497.

*To all whom it may concern:*

Be it known that I, WALTER E. CRANE, a citizen of the United States, residing in Hartford, in the county of Hartford and State of Connecticut, have invented certain new and useful Improvements in Folding, Wrapping, and Addressing Machines, of which the following is a specification.

My invention relates to automatic machinery for preparing printed publications, such as pamphlets and magazines and the like, for distribution through the mails and otherwise, and to that end it comprises mechanism by which the separate bound or stitched copies of such printed publications may be successively fed into the machine, rolled into a compact form and a suitable envelop or wrapper at the same time placed upon each copy, such wrapper having meantime been subjected to an independent operation by which the name and address of the party to whom such copy is intended to be forwarded, is stamped or imprinted thereon, in accordance with a previously prepared schedule; each of said operations being automatically performed in due order and succession, and with great rapidity.

Figure 1:
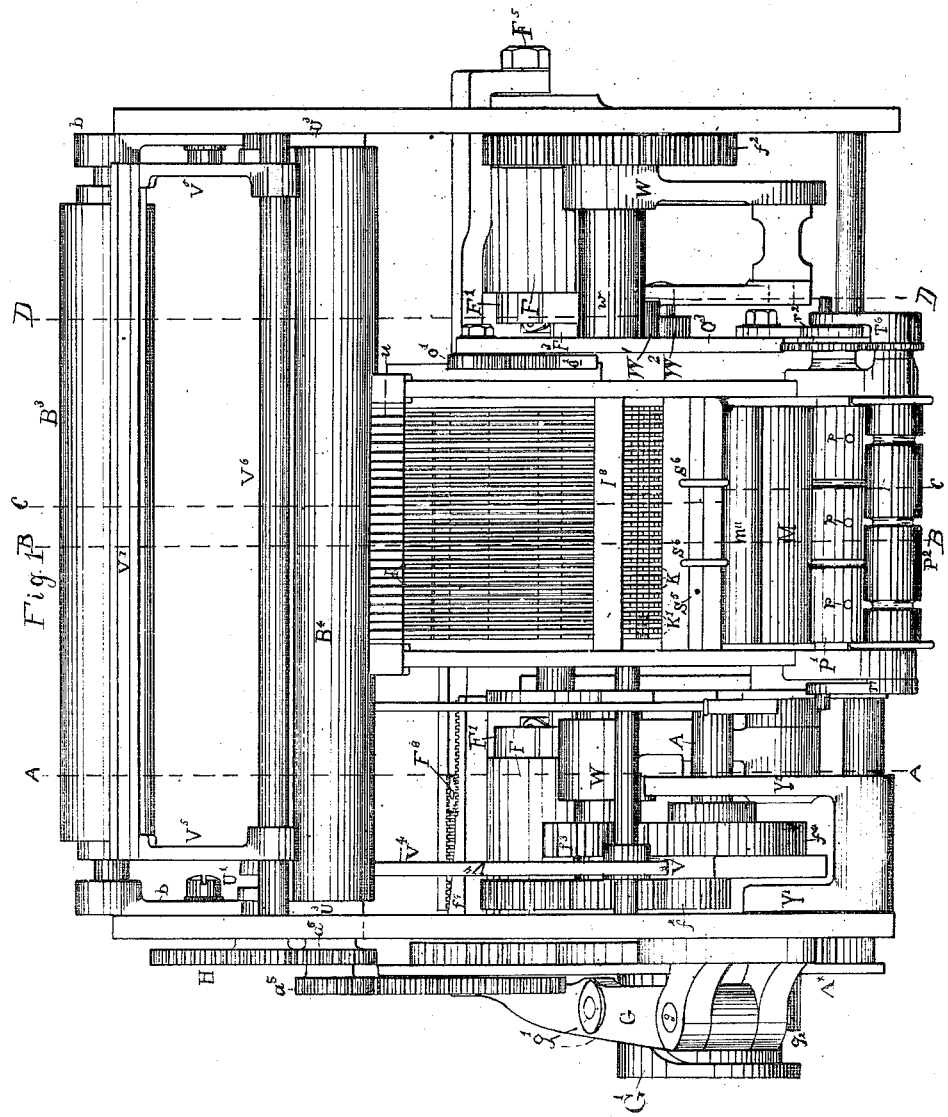
Figure 2:
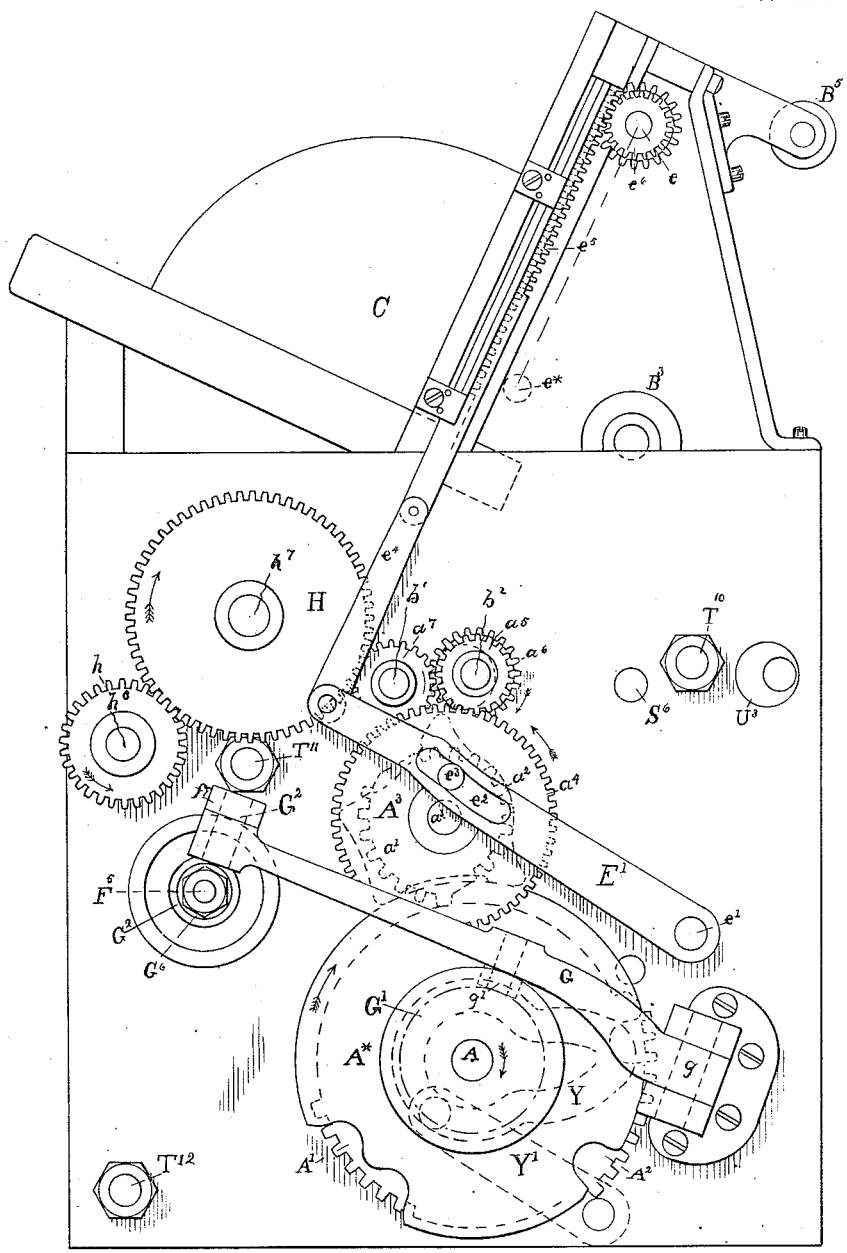
Figure 3:
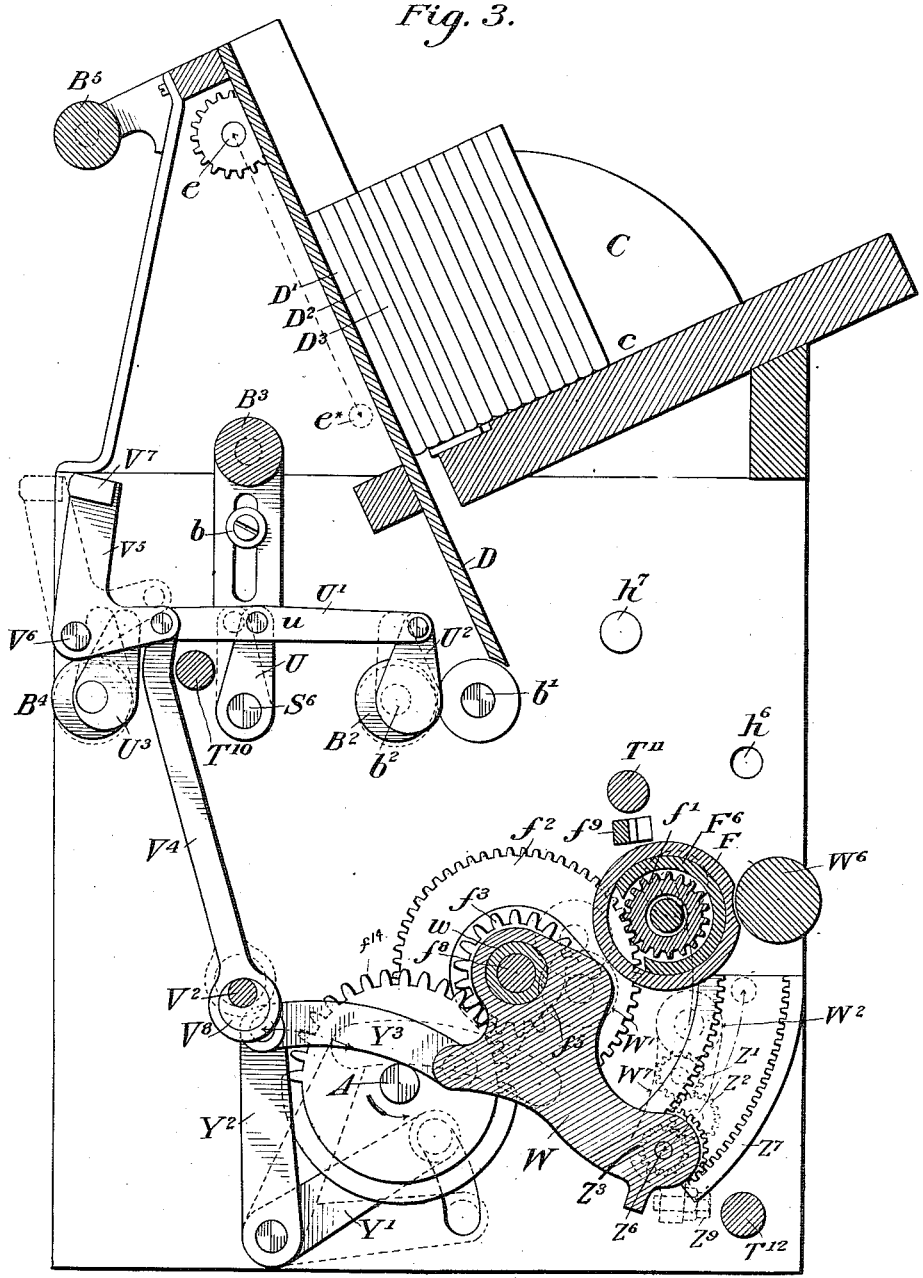
Figure 11:
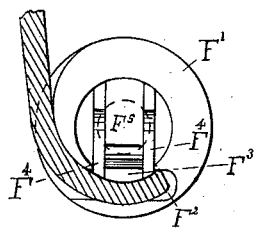
Figure 12:
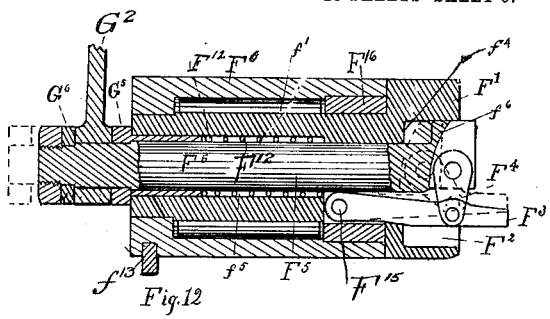
Figure 7:
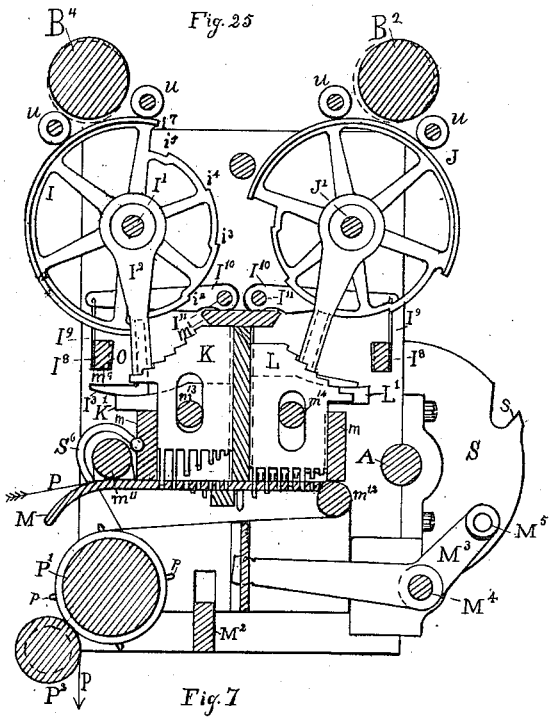
Figure 13:
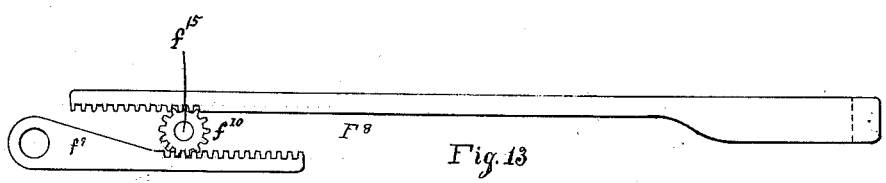

In the accompanying drawings, Figure 1 is a front elevation (with certain parts omitted) and Fig. 2 a side elevation of my machine, and Figs. 3 and 4 are vertical transverse sections of the same, taken in the plane of the dotted lines A A and D D respectively, Fig. 1; Fig. 5 is an elevation, and Figs. 6 and 7 are transverse vertical sections of the composing and printing mechanism, taken in the plane of the dotted lines B B and C C, respectively, Fig. 1; Fig. 8 is a plan view of the same; Figs. 9 and 10 show, on an enlarged scale, certain details of the type-carriers; Figs. 11, 12 and 13, are details of the rolling and wrapping mechanism; Figs. 14 to 18 inclusive, are details of the composing and printing mechanism; Figs. 19 and 20 show certain details of the flatting mechanism; and Figs. 21, 22, 23, 24 and 25 show certain parts of the actuating mechanism in detail; Figs. 26 and 27 illustrate more clearly the details of the type-carriers; Fig. 28 is a detail of the flatting mechanism; Fig. 29 illustrates the manner in which the racks shown in Fig. 13 and the rolling mechanism shown in Fig. 12 are mounted and connected. Fig. 30 illustrates in detail the shaft $e$ and mechanism for feeding the pamphlets, which are also shown on a smaller scale in Figs. 2, 3, and 4.

The machine as a whole may be more readily understood if it be considered to comprise several distinct but coöperating trains of mechanism, all moving in a certain positive relation to each other in order to effect the general result. These several trains of mechanism may be enumerated as follows:—first, mechanism for supplying a continuous band of paper, from which the wrappers are formed; second, mechanism for presenting, one by one the magazines or pamphlets which are to be wrapped and addressed; third, mechanism for composing and printing the names and addresses of the intended recipients upon the several wrappers; fourth, mechanism for applying paste for securing said wrappers; fifth, mechanism for rolling, wrapping and securing the wrapper of each successive pamphlet or magazine, and sixth, mechanism for flatting and ejecting the same.

The main shaft of the machine, from which the various trains of mechanism severally derive their motion, is shown at A. It is kept in continuous rotation by the application of any suitable power, in the direction indicated by the arrows in Figs. 2, 3 and 4. This main shaft, by means of suitable intermediate mechanism hereinafter to be described, communicates an intermittent advance movement at the required times, to a continuous band of wrapping paper B (Fig. 4) which is fed from a roll (not shown) and is ultimately cut off in suitable lengths by automatic mechanism to form the individual wrappers, as hereinafter explained.

Upon the shaft A is keyed a wheel A* carrying upon its periphery two partial gears $A^1$ and $A^2$, which as said wheel A* rotates, engage successively with two corresponding partial gears $a^1$ and $a^2$ upon a stop-wheel $A^3$, which stop-wheel turns upon a fixed stud $a^3$. The relation of the two driven gears $a^1$ and $a^2$ to their respective driving gears $A^1$ and $A^2$ (see Fig. 21) is such that the driving gear $A^2$ of greater radius engages with the driven gear $a^2$ of lesser radius during one portion of each revolution of the shaft A, and the driving gear $A^1$ of lesser radius with the driven gear $a^1$ of greater radius during another portion of each revolution of the shaft A. The effect of this organization of gearing is such that during each complete revolution of the main shaft A, the subsidiary wheel $A^3$ upon the stud $a^3$ also performs one complete revolution, but with an intermittent and non-uniform motion, four-tenths of such revolution being produced at a comparatively slow rate by the action of the gear $A^1$, and after a pause, the remaining six-tenths of such revolution at a considerably more rapid rate, by the action of the gear $A^2$. The stop-wheel $A^3$, upon which the gears $a^1$ and $a^2$ are fixed, is provided with concave slip surfaces $a^8$ and $a^9$, which engage with the periphery of the wheel $A^*$ in such a manner as to prevent the former from revolving in either direction, when the teeth of the respective partial gears are not in engagement.

The intermittent advance movement of the wheel $A^3$ is transmitted by the toothed wheel $a^4$ to the pinion $a^5$ and thence to two spur-gears of equal radius $a^6$ and $a^7$, which latter are keyed to the axes $b^1$ and $b^2$ of two feed-rolls $B^1$ and $B^2$ (see Fig. 4).

The endless band of wrapping-paper B (Fig. 4) coming from the roll (not shown), is conducted to the feed-rolls $B^1$ and $B^2$ over or around a series of rolls $B^5$, $B^4$ and $B^3$. After passing the feed-roll $B^1$, it advances downward along an inclined chute or way D, in passing along which it is overtaken by the pamphlet which is to be enwrapped by it, as will hereinafter be explained.

The pamphlets intended to be wrapped and addressed are placed one beside the other, with their backs downward, in a trough C, as shown at $D^1$, $D^2$ and $D^3$ in Fig. 4. They are fed one by one into the wrapping machinery, by means of suitable fingers, one of which is seen at E, which fingers are mounted upon a descending rod $e$. The mechanism for moving the rod $e$ with its attached fingers is best seen in Fig. 2. $E^1$ is a swinging arm or lever, pivoted to the frame of the machine at $e^1$. A curved slot $e^2$ is formed in this arm, and a pin $e^3$, moving at the proper time in this slot, actuates the arm $E^1$ so as to communicate a descending longitudinal motion to the connecting rod or link $e^4$, which motion is transmitted to the rod $e$ through a differential multiplying rack-and-pinion gear $e^5$, $e^6$ more clearly shown in Fig. 30. By the action of this differential gear, the rod $e$, carrying with it the fingers E (Fig. 4), at a predetermined point once in each revolution of the main shaft A, suddenly descends from its normal position to the position indicated in dotted lines at $e^*$ in Figs. 2 and 3, carrying the foremost one of the pamphlets (as $D^1$ in Fig. 4), down the inclined chute D. The pin $e^3$, from which the motion of the arm $E^1$ is derived, receives an intermittent rotary motion around the stud $a^3$ at the proper time during each revolution of the main shaft A, by the operation of the partial gears $A^1$, $A^2$, $a^1$, $a^2$, hereinbefore described.

When the pamphlet $D^1$, descending through the inclined chute D, reaches the wrapper feed-roll $B^1$, it continues to move downward in contact with the moving wrapper-strip B, but faster, until it enters the rolling and wrapping mechanism next to be described.

The position of the rolling mechanism in the assembled machine is shown in Figs. 3 and 4. Its construction can be best seen in the detail Figs. 11, 12 and 13.

The rolling mechanism is supported within two stationary cylindrical cases F F, which are affixed to the opposite inner faces of the side-frames of the machine. This mechanism is best seen in Figs. 3 and 4 and (more in detail) in Figs. 11, 12, 13 and 29. It is constructed in two parts, which are alike and which act in concert, taking hold of the opposite ends of each successive pamphlet when the same is presented to it, and hence it is deemed necessary only to describe the construction and operation of one of these duplicate parts.

$F^1$ (Figs. 4, 11 and 12) is a rolling-clamp, which is capable of four independent movements, viz: first, to clamp the presented pamphlet by its ends; second, to revolve within its cylindrical case a sufficient number of times to form said pamphlet with its wrapper, into a compact roll; third, to unclamp or release said pamphlet, and fourth, to withdraw in a lateral direction, leaving the rolled pamphlet enveloped in its wrapper, to be ejected by the flattening mechanism, hereinafter to be described.

When a pamphlet, accompanied by its wrapper bearing the printed address, is caused to descend through the chute D, (Fig. 4), its back together with the end of the wrapper enters a slot $F^2$ formed in the roller clamp $F^1$, which slot is normally in position to receive it. The first movement, that of clamping, the pamphlet then takes place, and this is effected by the recess or opening $F^2$ in the end of the roller clamp which is adapted to receive the corner of the pamphlet. The longitudinally projecting movable jaw $F^3$, pivoted in roller clamps $F^1$ by means of a pin $F^{15}$, when the roller clamp moves inwardly, acts to secure the pamphlet within this opening. This movement is effected by the cam $G^1$ which actuates the lever G, movable piece $G^2$, bolt $F^5$ and spring $F^{12}$, and is limited by the stop $f^{13}$, but the movement of the bolt $F^5$ continues, compressing the spring $F^{12}$ and forcing the longitudinally projecting jaw $F^3$ from the position shown in dotted lines in Fig. 12 to the position shown in full lines by means of the link F⁴, the full lines representing the clamped position.

The sliding bolt F⁵ receives its longitudinal movement at the proper time, from a lever G (Fig. 2) pivoted at g to the frame of the machine and moved laterally by a roller g¹ which runs in a cam-groove g² formed in the periphery of the wheel G¹. This wheel and groove are shown separately in Figs. 22 and 23, and the development of the groove on a plane surface in Fig. 24. A movable piece G² is jointed to the end of the lever G and is formed into a collar which encircles the bolt F⁵ (see Fig. 12) between the collars G⁵ and G⁶, and thus imparts, when required, the necessary longitudinal movement to said bolt.

The second movement, that of rolling the pamphlet within its wrapper after it has been clamped by the jaws F³ is effected by causing the roller-clamp F¹ to revolve about its own axis, as many times as necessary (in the present machine, three times). As hereinbefore stated, the roller-clamp F¹ turns within the cylindrical casing F and also within the longitudinal sliding sleeve F⁶ and its ring F¹⁶. It has a pinion f¹ secured on a portion of its exterior, the teeth of which pinion extend far enough in a longitudinal direction, to permit of a considerable movement of said pinion parallel to its axis of revolution (for purposes hereinafter to be explained), without becoming disengaged from the toothed wheel f² by which it is driven. The wheel f² which works through a slot in the sleeve F⁶ (shown only in Fig. 3) receives motion from a pinion f³ fixed upon the same axis, (Figs. 3 and 4) which pinion has a partial gear engaging with another partial gear f¹⁴ fixed upon the main shaft A. Thus during the time of one-half of each complete revolution of the shaft A, the roller-clamp F¹ is caused to perform three revolutions, winding the pamphlet into a compact volute, with its back or stitched edge inside and its wrapper outside, which latter, by the operation of rolling, has its loose end pressed into place and secured by the line of paste which has been applied to it as hereinafter explained.

Figure 24:
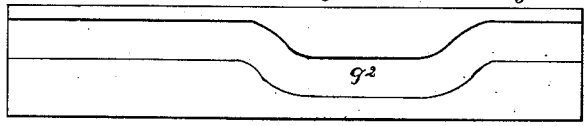
Figure 16:
Figure 17:

The third movement, that of opening the clamps, is performed by an operation the reverse in all respects of that already described, the necessary movement being effected at the proper time by the action of the roller g¹ moving in the groove g² of the cam-wheel G² (see Fig. 24).

A ring F¹⁶ in the sleeve F⁶ is operable therewith being fixed in said sleeve. This ring is so made, however, that it may be removed for the insertion of the pinion f¹ of the roller-clamp F¹, and after insertion, the ring constitutes one bearing for said roller-clamp F¹ in the sleeve F⁶.

The fourth movement is the result of a continuation of the same movement as that last described, which releases the clamping mechanism. When the bolt F⁵ has been moved far enough to the left (as seen in Fig. 12) to release the clamping jaw F³, a continuation of its motion in the same direction brings its head f⁶ against a shoulder f⁴ on the body of the roller-clamp F¹, whereby the latter with the sleeve F⁶ is moved bodily within the outer case F, and in the direction of its longitudinal axis, until the clamp is entirely withdrawn from the pamphlet. The mechanism hereinbefore described, by a continuation of its movement, restores the roller-clamp F¹ to its normal position, as seen in Fig. 4, before the next succeeding pamphlet is moved into position to be clamped and rolled. This longitudinal position of the roller-clamp F¹ is restored by the reversal of the movement of the bolt F⁵, which has been described. The descent of the pamphlet to the proper position to be clamped, and the sliding inward of the roller-clamps, are timed so as to be completed simultaneously; and hence the back, or bound edge of the pamphlet strikes upon the roller-clamps at the lower extremity of the recess or opening F², immediately after which, the completion of the movement of the sliding-bolt F⁵, causes the clamping of the pamphlet, as before stated.

The longitudinal movement by which the operations of clamping and releasing are effected, must necessarily operate simultaneously at each end, but in opposite directions, upon the respective clamps at opposite ends of the pamphlet. This simultaneous movement is imparted to the right-hand clamp (Fig. 1) by a double-acting rack-and-pinion movement shown at F⁸ in Fig. 1, and in detail in Figs. 13 and 29, the operation of which may be readily understood without detailed explanation. The racks F⁸ and f⁹ are mechanically connected by a pinion f¹⁰ mounted on a stud f¹⁵ in the sleeve F.

It will be observed that the roller-clamp F¹ is capable of a motion of rotation only, within the cylindrical case F and also that the sleeve F⁶ and its ring F¹⁶ slides longitudinally within the outer case F.

The pasting of the wrapper, together with the operation of cutting it off in suitable lengths, is effected soon after the operation of rolling is begun, by a special system of mechanism, deriving its motion from the spur-wheel a⁷ on the axis of the wrapper feed-roll B¹ (Figs. 2 and 4). The toothed wheel H receives its motion from the wheel a⁷ and in turn imparts motion to another wheel h having half as many teeth. The wheel h drives a paste-roll h¹ on shaft h⁸ (Fig. 4) which revolves in a paste-trough h² while the wheel H is secured to a shaft h⁷ which carries a cross-bar h³ having a pad h⁴, which, once during each revolution, is charged with paste by a rolling contact with the surface of the paste-roll $h^1$, and then, continuing to revolve, applies a line of paste to the moving wrapper-strip B as it passes over the feed-roll $B^1$ into the chute D. Directly behind the line of paste, a knife-edge $h^5$ upon the bar $h^3$, entering a corresponding groove in the roller $B^1$ cuts off the wrapper, leaving the portion so cut off free to be rolled up, together with the pamphlet, by the operation of the rolling mechanism, hereinbefore described. When the operation of rolling is completed, the line of paste which has been applied by the pad $h^4$, being at the end of the wrapper last rolled, adheres to the preceding turn of the wrapper and serves to secure the whole, precisely as in the ordinary way of wrapping by hand. The rolling is done against the rolls $W^1$ $W^2$ and $W^6$ which serve to repeatedly press down the pasted end of the wrapper.

When the pamphlet has been rolled within its wrapper as hereinbefore explained, and the loose end of said wrapper has been secured, it is in most cases desirable that the cylindrical roll into which the pamphlet has thus been formed should be flattened, in order to occupy a smaller space, when thrown loosely into a mail-pouch or other like receptacle. This operation may be effected, when required, by the following described mechanism: Referring to Figs. 1, 2 and 4, $w$ is a sleeve turning freely upon the shaft $f^8$. Two rolls $W^1$ and $W^2$, are carried upon arms W W affixed to opposite ends of said sleeve $w$. These arms, together with the rolls which they carry, receive an oscillatory movement, up and down, from a cam-groove Y formed in the side of the double partial gear wheel $A^1$ (see Figs. 2 and 21) which is communicated through the intermediate rocker-arms $Y^1$ and $Y^2$ and curved connecting link $Y^3$ (Fig. 3). One roll $W^1$ is permanently mounted in bearings upon the arm W. The other roll $W^2$ has a pinion, (not shown) by which it is connected through a train of spur-gears $z^1$ $z^2$ $z^3$ to a pair of pinions $z^4$ $z^5$ mounted on a shaft $z^6$ (see Figs. 3, 4, 19 and 20). One of these last mentioned pinions, $z^4$, engages with the teeth of a stationary segmental rack $z^7$, and in like manner the other of said pinions $z^5$ engages with the teeth of another similar rack $z^8$. The pinions $z^4$ and $z^5$ are mounted loosely upon the shaft $z^6$ of the driving-pinion $z^3$, but are connected therewith by ratchet-dogs $Z^{10}$ (Fig. 20) which engage with the pinions respectively in similar directions. It results from this organization, that the oscillatory movement of the arms W, carrying with them the roll $W^2$ and $W^1$ and its connected pinion $z^3$, carries the latter to-and-fro through the path indicated by the dotted lines in Figs. 3 and 20, while at the same time a continuous advance rotation of the roll $W^2$ is produced by the alternate action of the pinions $z^4$ and $z^5$, exerted through their respective dogs $z^{10}$ upon the shaft $z^6$, and the train of intermediate spur-gearing which connects the same with the roll $W^2$.

Both the rolls $W^1$ and $W^2$ are shorter than the rolled pamphlet, so that at the extremity of their ascending movement, they enter between the inner ends of the cylindrical cases F F, within which the roller-clamps $F^1$ $F^1$ operate, and thus receive the pamphlet the instant it has been released by the withdrawal of the clamps, as hereinbefore explained. The distance between the rolls $W^1$ and $W^2$ is rendered adjustable, by providing for the changing, within certain limits, of the position of the portion of the arm W which carries the roll $W^2$ and its train of gears. A set-screw $z^9$ serves to adjustably fix this movable part $W^7$ to any desired position.

With the foregoing explanation, the action of the flatting mechanism will be readily understood. The rolled and wrapped pamphlet is received from the rolling mechanism by the flatting-rolls $W^1$ and $W^2$, which have risen to the position indicated by dotted lines in Fig. 3. These rolls are covered with india-rubber or other like semi-adhesive substance, and their motion is so timed as to engage with the previously rolled pamphlet at the precise instant that the side of said pamphlet toward which the back has been folded (and which is more or less flattened) confronts them. The rolled pamphlet is thus readily grasped by said rolls.

It will be observed that the rolling-clamps $F^1$ $F^1$ are completely withdrawn before the flattening rolls $W^1$ and $W^2$ have been raised to the position indicated in Fig. 3.

It will be observed that the flatting rolls $W^1$ and $W^2$ during their movement, pass one on each side of the rolled pamphlet, while the projecting extremities of the clamps $F^3$ are still within it. The roll $W^2$ has, as hereinbefore explained, a two-fold movement, one upon its own axis, compressing the rolled pamphlet between itself and its companion roll $W^1$, and the other movement (common to both rolls) simultaneously carrying the pamphlet downward away from the rolling mechanism, and finally ejecting it, in a flattened condition, at the bottom of the machine, where it falls into a mail-pouch or other suitable receptacle provided for the purpose.

While the wrapper-strip B is drawn through the machine by the intermittent action of the feed-rolls, it makes two pauses during each revolution of the main shaft A, as hereinbefore explained. Advantage is taken of these pauses to imprint an address upon the proper portion of the strip, which is afterward automatically cut off, as hereinbefore explained, to form the wrapper of a pamphlet.

The type for printing each separate line of the address are assembled by automatic mechanism, after which the impression of the assembled line is made by a single movement of a platen. In the machine herein described, provision has been made for the printing of three lines upon each wrapper, which will ordinarily be sufficient for the purposes for which it is principally designed. The first line may contain the name of an individual, and the second the street and number or other particular designation of his place of residence. These two lines are printed from assembled type. A third line is usually required containing the name of the town or city and State, which I prefer to imprint by means of special automatic mechanism of a different character, as hereinafter described.

The general principle of my type-assembling mechanism embraces a range of independent type-carriers or segments, equal in number to the maximum number of characters required to form an integral line for printing. Each of these type-carriers carries a series of type or characters ranged successively after one another, and comprising all the letters, numerals or other characters required to be used in the particular work which the machine is intended to do. These separate type-carriers are arranged compactly side by side, each occupying a space equal to the breadth of a character, leaving of course the usual and necessary interval of space between the individual letters which are to form the line. Such being the arrangement, it is obvious that each type-carrier may be moved to bring any particular one of its characters to a given point of alinement, and that the several letters thus selected may be ranged in a transverse line, so as to spell words or sentences as required. In my apparatus, the assemblage of the letters in this manner, is effected by automatically controlling the movements of the type-carriers by means of a perforated pattern-strip, which has been previously prepared for the purpose by an independent perforating machine.

In the machine herein described, I have provided twenty-five type-carriers, each of which carries thirty-nine characters, or forty, inclusive of the word-space. But it is to be understood that my invention is not limited in this respect, as any number of type-carriers may be used, and the number of characters upon each may likewise be varied in accordance with the character of the particular work required to be performed.

Figure 18:
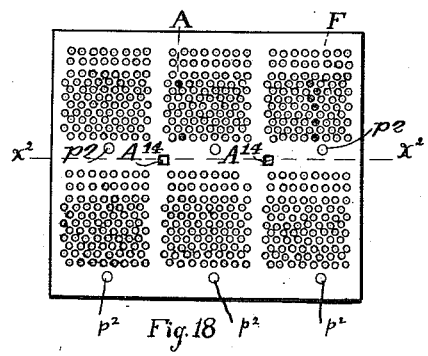
Figure 21:
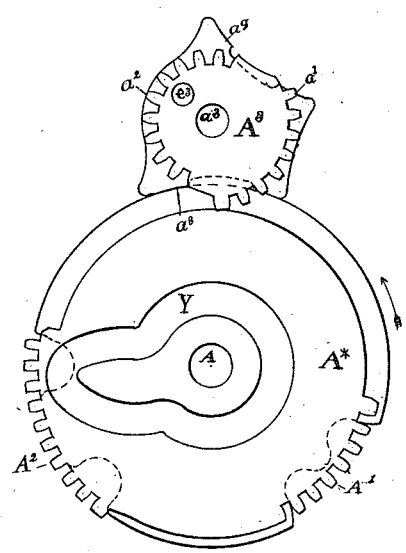
Figure 22:
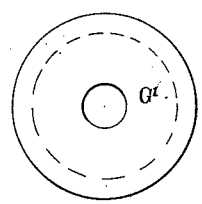
Figure 23:
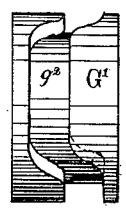

Fig. 18 represents a section of the pattern-strip, and is an example of one way in which the perforations may be arranged. The perforations shown in the figure represent two lines of type, those perforations above line $x^2$ $x^2$ representing one line of type and those perforations below said line representing the other line of type. The perforations corresponding to each character are arranged in one or both of two rows, one of said rows being a part of one group of perforations and the other row a part of the other group. Each character may therefore consist of perforations selected from either one or both of two groups. The individual perforations of one group are arranged in different lines or ranges, both in a horizontal and vertical direction, from those of the other group.

In Fig. 18, each different character is represented by a different arrangement of perforations, and these may be formed into such a conventional code as may be found convenient or desirable to meet any particular requirement. In the figure, the perforations of the first line have been arbitrarily arranged to represent a line of type containing the characters 1 2 3 4 5 6 7 . A E I O U Y - N R S T F D 8 9. The groups of perforations corresponding to each character are situated in one or both of two rows; that is to say, each individual character consists of from one to eleven perforations, selected arbitrarily from either one or both of the two rows appropriated to each character, and occupying one or more of eleven different positions. In other words, each character of the pattern-strip is composed of perforations, situated at vertical positions arbitrarily selected from two rows. As an example, the letter (A) in the figure is represented by two perforations, to wit: the first perforation in the first row of one group of perforations and the second perforation in the fourth row of the other group of perforations (said perforations being shaded in the diagram to render them more easily distinguishable); the letter (F) is represented by six perforations to wit: the fourth in the first row, the third in the second row, the second in the third row and the first in the fourth row of the first group of perforations and the fifth in the third and fourth rows of the other group of perforations, and so of all the other letters and characters, as shown in the diagram. The particular arrangement for each character, as herein shown, is of course purely arbitrary and conventional, and may be varied in the construction of different machines, or of the same machine, as required.

It is to be observed that sight-reading of the perforations actually takes into account nothing more than the termination of the row or series of perforations which constitute each group. It will also be understood that the selectors are each placed in successive positions inversely corresponding with the termination of the row of perforations which are adjacent to said selector when the platen is raised. Thus where there is no perforation the longest one of the supporting pins of the selector will cause the same to be raised to its uppermost position. One perforation will permit the above mentioned longest supporting pin of the selector to pass through the paper, while the next longest will be stopped by and will rest upon the paper and thereby cause the selector to assume the next highest of its several positions; hence the difference in the number of combinations formed in the pattern-strip presented to either selector designates that the next supporting pin of the selector (counting from the termination of the row or group) will control the height of the placing of the selector. I prefer to designate this arrangement of the pattern-strip as a "cumulative" series of perforations in order to distinguish it from a series in which the perforations are merely employed with reference to their possible permutations. I make use, however, of the permutation principle to a certain extent in that I combine the several positions of one selector with those of the other selector through the instrumentality of the shoulders formed upon the selector $K^1$ and the spirally arranged steps of the type-carrier in conjunction with the extension $I^3$ of the selector $K^2$. In practice, these several rows of perforations are arranged compactly and very close together, as shown in Fig. 18. In the same figure is shown a line of three equidistant perforations $p^2$, which may be of larger size and situated between adjacent lines of groups of perforations corresponding to a line of characters. These perforations have no relation to the significant characters, their function being merely that of imparting the necessary progressive movement to the pattern-strip, as hereinafter shown.

The mechanism by which the assemblage of a line of characters upon the type-carriers is controlled by the perforations of the pattern-strip will next be explained.

In the machine herein shown, two complete sets or series of type-carriers are provided, as shown at I and J in Figs. 5, 6, 7, and 8. Each set of type-carriers provides for the assembling and printing of a separate line of matter, one line for instance spelling a name, and the other a street and number. As many of these independent type-carriers are arranged side by side upon a common axis as there are required to be of letters or characters constituting a full line. As each individual type-carrier, with its operating and controlling mechanism, is in principle precisely like every other one, a description of a single one will be sufficient to render the construction and mode of operation intelligible.

Each series of characters, including, letters, numerals, points, and a space, is formed in relief upon a segment of a circle, which circle forms the periphery of the type-carrier or type-wheel, as seen in Fig. 6, in which I is the type-carrier, and $i$ the series of type, having its characters arranged in succession upon a portion of its periphery. The remaining portion of the type-carrier is provided with five equi-distant shoulders, or stops $i^1$ $i^2$ $i^3$ $i^4$ $i^5$, arranged spirally or step-wise, that is to say, at progressively different distances from the center or axis, measured along the respective equidistant radii.

Each type-carrier I is mounted frictionally upon an axis $I^1$, to which intermittent rotation to-and-fro, is communicated at the required times by mechanism hereinafter to be described, the extent of such intermittent rotation in either direction being a little in excess of one-half of a complete revolution. The type-carrier carries a loosely mounted arm $I^2$. The mounting of the type-carrier and arm $I^2$ is illustrated in detail in Figs. 9, 10, 26 and 27. Each type-carrier is provided with a slightly convex circular washer $I^4$ secured to the shaft $I^1$ by a feather $I^5$, and each such washer has a sleeve $I^6$ upon which its type-carrier I has a movement of rotation. A collar or hub $I^7$ is also formed upon the type-carrier, upon which the arm $I^2$ turns loosely, being held between the type-carrier and the washer. The to-and-fro motion of rotation of the arm $I^2$ upon its axis, is limited in each direction by the fixed stops $m^1$ and $m^2$, and that of the type-carrier is limited in like manner in reference to the arm $I^2$ by the stops $i^1$ and $i^7$ at the opposite ends of the segment upon which the types are situated, which stops engage with the opposite lateral edges of the movable arm $I^2$.

At the end of the arm $I^2$ is a slide $I^3$, which moves freely in guides formed in said arm, such movement however being in a radial direction only. The outer end of this slide $I^3$ is shaped to correspond with the arc of a circle concentric with the axis of the type-carrier I. The arm $I^2$ and its corresponding slide $I^3$, I will term the duplex intercepter, between the type-carrier and its corresponding pair of selectors.

In the machine herein described, each type-carrier, starting from the zero point, in which position it is represented in Fig. 6, is capable of being arrested in any one of forty different angular positions, whereby any particular one of its forty separate characters may be brought into the line of assemblage $x$ $x$ Fig. 6 as required. Such angular position of the type-carrier is controlled by the distribution of perforations upon the pattern-strip P before referred to, which act upon the arm I² and the slide I³ through the medium of selectors, of which there are two to each type-carrier. One of these selectors is seen at K, and its companion (shown partly in dotted lines) is immediately behind it, as shown at K¹. The selectors are flat plates of metal, movable up and down within certain limits upon guides formed by pins $m^{13}$ and $m^{14}$ (Figs. 7 and 25) which project from standards rising above, and integral with the lifting table M. Considering first the rear selector K¹, it will be seen that its upper edge is shaped to a curve, coinciding nearly with that of the outer end of the slide I³, which by the action of gravity, rests against and is supported and held in position by it. The lower edge of the selector K¹ is armed with four downwardly projecting equidistant self-supporting pins of successively diminishing length, $k^1$ $k^2$ $k^3$ $k^4$, forming what I term a stepped stop (see Fig. 14) corresponding with an equal number of holes in a metallic table M which lies horizontally beneath it, and over which the perforated pattern-strip P passes as shown in Figs. 6 and 7. Four examples of differently perforated pattern-strips are shown in Fig. 14, the thickness of the strips being exaggerated for greater clearness of illustration.

From the preceding explanation, it will be obvious that by raising the table M with the pattern-strip P lying upon it, the selector K¹ may be raised vertically against the action of gravity, and thus be made to occupy any one of five different equidistant positions of elevation, the extent of such elevation depending inversely upon the cumulative number of holes in the row opposite to it in the pattern-strip. Thus if there were no hole in the pattern-strip, the surface of the strip would engage the flat end of the longest supporting pin $k^1$ and raise the selector K¹ through four divisions of vertical space; but if there chanced to be a single hole opposite pin $k^1$, the surface of the strip would then in like manner engage with pin $k^2$, and the selector would only be raised through three divisions of space, and so on, the distance through which the selector is raised, depending in each case inversely upon the cumulative number of holes forming the corresponding row in the pattern-strip. It is evident that if the strip has four perforations opposite the four supporting pins, then the selector K¹ will not necessarily be raised at all which leaves it in its fifth position. The other selector K, is constructed upon substantially the same principle and operated in like manner, the only difference being that its stepped stop consists of seven supporting pins instead of four, and is capable of being raised through seven equidistant divisions of vertical space instead of four and hence may be left in any one of eight different vertical positions according to the number of cumulative perforations in the row opposite it in the pattern-strip.

The vertical distance at which the two selectors K and K¹ are respectively left at any given time, conjointly determines the angular position of the corresponding type-carrier at such time. The manner in which this is effected will now be described.

The inner end of the radially movable slide I³ upon the arm I², engages with one or another of the spirally disposed shoulders $i^1$ $i^2$ $i^3$ $i^4$ $i^5$ upon the type-carrier I, according to the distance through which it has been moved in a radial direction, and this distance is determined, as hereinbefore explained, by the extent of movement which has been imparted to the selector K¹, which is in turn controlled by the arbitrary perforations of the pattern-strip. The other selector K has seven shoulders formed stepwise upon its upper edge, as shown at $m^2$ $m^3$ $m^4$ $m^5$ $m^6$ $m^7$ $m^8$, which shoulders are situated in the vertical plane of the path of the shoulder $i^6$ upon the end of the arm I². The final shoulder $m^1$ also acts as an eighth shoulder, in its relation to the other seven of the series. The particular shoulder upon the selector K or $m^1$ with which the arm I² will engage is therefore determined in each instance by the vertical distance through which the selector has previously been raised by the table M, and this distance, as hereinbefore explained, is in turn controlled by the arbitrary perforations of the pattern-strip P.

It is to be noted that notwithstanding non-existence in some cases, of perforations in the pattern-strip corresponding to the supporting pins upon either of the selectors K K¹ L or L¹, the said selectors are thereby left in a determinate working position, and such position is to be regarded as in every respect equivalent to one phase of an organized group of perforations.

The forty angular divisions of the type-carrier, corresponding to the forty significant characters (inclusive of the space) may be regarded as consisting of five main groups comprising eight subdivisions in each group. The vertical position of the first selector K¹ determines the group, while the vertical position of the second selector K, determines the particular character or subdivision of such group, which is to be brought into the line of assemblage $x$ $x$. When a line of characters is to be assembled, the shaft I¹, by means of mechanism hereinafter to be described, is caused to rotate a certain distance in the direction indicated by the arrows, carrying with it the washers belonging to the several type-carriers upon which are arranged the characters to be assembled.

Each type-carrier I, with its attached arm I² is carried by friction, along with the washer I⁴, until arrested by the selectors at predetermined points as hereinbefore explained. Thus each type-carrier is ultimately arrested in a specific angular position, so as to present the desired character at the line of assemblage x x such position having been predetermined, in the case of each carrier, by the perforations of the pattern-strip. Thus for example, let it be assumed that the letter which is to be presented by a particular type-carrier is F. The perforations forming this letter are indicated in Fig. 18 as previously described. When the pattern strip, provided with these particular perforations, has been brought into position upon the table M and lifted, it comes into contact simultaneously with the supporting pins of the two selectors K¹ and K, whereupon the first selector K¹ will be raised through two divisions, and the second selector K through two divisions of space. Consequently when the type-carrier I rotates, the arm I² will not move until the inner end of the slide I³ engages with the stop i³ upon the type-carrier, but when this has taken place, the type-carrier I and arm I² will rotate together until the shoulder projection i⁶ of the arm is arrested by the shoulder m⁴. When this has been accomplished, the angular position of the type-carrier I, will be such that the letter "F" will be in the line of assemblage. The same result will be effected in the case of each one of the other coöperating type-carriers of the series forming the assembled line of characters, the position of which is indicated by the intersecting of the radial dotted line x x in Fig. 6.

As hereinbefore explained, there are two independent sets of type-carriers, I and J (Figs. 6 and 7) which are duplicates of each other in every respect except that their directions of intermittent advance and retrograde rotation are opposite to each other, making one set with the selectors "rights" and the other set "lifts." This alternate advance and retrograde motion of rotation of the shafts I¹ and J¹, for alternately assembling and distributing or returning to zero the selected characters upon the type-carriers, is effected by mechanism receiving its motion directly from the main shaft A of the machine. This mechanism (best seen in Fig. 4,) comprises two toothed segments O¹ and O² fixed upon the axes I¹ and J¹ of the respective sets of type-carriers. These segments engage with racks o¹ and o² upon opposite edges of a slide-plate O, movable to-and-fro upon ways o³ and o⁴ fixed upon the frame of the machine. A pitman O³ is pivoted to the slide plate O, and is attached at its opposite end to a crank-pin O⁴ on a disk N keyed to the main shaft A. It will therefore be understood, that as the wheel N advances in its rotation in the direction indicated by the arrow, from the position shown in Fig 4, the slide-plate O will first be drawn downward a trifle, the washers all slipping within the type-carriers. It will then remain stationary while the crank-pin O⁴ is passing over its center, and finally will be raised a distance corresponding to the throw of pin O⁴, thus causing the axes of the respective type-carriers, I¹ and J¹, to rotate as hereinbefore explained, in the proper direction to simultaneously assemble the two lines of type upon the respective sets of type-carriers. All carriers reach their respective stops before the completion of the advance movement of plate O making a short pause, during which the impression of the assembled lines is taken, as hereinafter explained; the continuing forward motion of the wheel N, imparts a retrograde movement to the slide-plate O, which is communicated to the type-carriers, breaking up the assembled lines of type, and restoring the individual type-carriers to the zero position. This last described movement of the type-carriers is completed before the wheel N in its rotation has reached the position shown in Fig. 4, but as said type-carriers are frictionally mounted, the stoppage of them at the zero-points does not interfere with the continued rotation of the wheel N and crank-pin O⁴.

The raising and lowering of the table M at the proper time in the course of each revolution of the main shaft A, is effected by means of an angular lever M³ which is pivoted to the frame of the machine at M⁴. This lever carries a roller M⁵ at the end of its shorter arm, which roller travels in a cam-groove M⁶ formed in the inner face of the driving wheel N, as shown in dotted lines in Fig. 4. The table M is integral with vertical sliding plates M¹ (see Fig. 25) which move up and down between guides m m and M² upon the frame of the machine. Affixed to the table M, and partaking of its movement, are loosely mounted rollers m¹¹ and m¹². The first of these serves to hold the pattern strip P P in position, as it passes on to the table M in the direction indicated by the arrows, preparatory to performing its function of determining the movement of the selectors K¹ and K and L and L¹. The pattern-strip is drawn forward around the second roller m² by the action of a sprocket-roller P¹ armed with pegs p p (of which there are preferably four sets of three in each set, arranged lengthwise of the roller P¹). These pegs engage with the three auxiliary perforations p² between each two lines of characters in the pattern strip P, hereinbefore referred to and shown in Fig. 18. The roller P² serves to maintain the pattern-strip in position upon the sprocket-roller P¹. Said sprocket-roller communicates to the pattern-strip P an intermittent advance movement at the proper time, by means of the following described mechanism:

A vertically moving lever R (Fig. 4) is pivoted at r¹ to the frame of the machine. This lever carries upon one arm a toothed segment r², while its opposite arm is provided with a specially formed elongated slot r, within which works a roller upon the pin O⁴ upon the wheel N of the main shaft A. The segment r² engages with a pinion R¹ connected with the toothed wheel R³ by a spring-pawl r³ which pawl engages with one of two teeth situated at diametrically opposite points of a disk-wheel fixed to the pinion R¹. The toothed wheel R³ is fixed upon the axis of the sprocket-roller P¹ which feeds the pattern-strip P, and engages with a pinion P⁴ upon the axis of the roller P². The configuration of the slot r is such that as the main shaft A advances from its zero position, as shown in Fig. 4, a brief period ensues during which no motion is communicated by the pin O⁴ to the lever R, and hence all the mechanism for moving the pattern-strip is held stationary, during the time in which the table M is being raised, and the selectors K¹ and K and L¹ and L brought into operation. The further advance movement of the shaft A (by means of the pin O⁴ working in the slot r), swings the lever R, and through the segment r², and pinion R¹, the disk-wheel secured to the pinion, is rotated backward a full half-revolution, which allows the pawl r³, to engage in the opposite notch; and during the retrograde, or return movement of the segment r², the engagement of the pawl with the disk, causes the sprocket-roller P¹ to perform half of a complete revolution, thus feeding the pattern-strip forward the requisite distance to bring the next succeeding line of perforated characters into place underneath each set of selectors.

Provision is made for positively returning the slides I³, L³ to their normal positions, when each successively assembled line of type, having been printed from, is broken up or distributed. This is effected by means of transverse horizontal movable bars I⁸ and L⁸ which are caused to descend at the proper instant of time in each revolution of the machine, carrying with them such of the slides as may previously have been raised by the action of the selectors in assembling the line, as hereinbefore described. This movement is produced by a pin I¹⁴, near the periphery of the wheel S (see Fig. 5) which at a certain point in its revolution, bears momentarily against an arm I¹², thus causing a partial rotation of the two shafts I¹¹ I¹¹ and their attached arms I¹⁰ I¹⁰ (see Fig. 7), which, by means of connecting rods I⁹ I⁹, lower the bars I⁸ I⁸. The return of the bars is immediately effected by a second pin I¹³ (Fig. 5), which is affixed to, and rises and falls with the table M, by which, as hereinbefore described, the selectors are operated.

Figure 25:
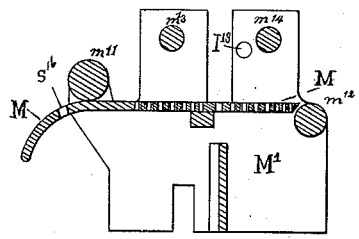

The lifting table M, which is seen in plan in Fig. 8, and in section in Fig. 25, is perforated with holes for the entrance of all the supporting pins upon the lower ends of the selectors K K¹ and L L¹, and also of the curved needles, one of which is seen at S⁶ in Figs. 6 and 7, the function of which will be hereinafter described.

It has hereinbefore been stated that the address to be printed upon a wrapper usually consists of two lines which are printed by the two assembled lines of type hereinbefore described. To these it is usually necessary to add a third line, containing the name of the post-office and State. Such additional line will in most cases be required to be repeated upon a succession of wrappers, in case a number of the addresses have a common post-office address, but will require to be changed from time to time according to circumstances. I have provided for this contingency, by stereotyping the several post-office addresses, and placing such stereotypes, one beneath the other, in the necessary orderly sequence, upon a movable vertical bar T (Figs. 5, 6 and 15), which moves in a guide T¹ attached to the frame of the machine. A rack t is fixed upon the back of the stereotype bar T, and this is made to move upward a proper distance, and at proper times, as required, by means of a toothed pinion S¹⁰, the movements of which are in turn controlled by an independent set of perforations A¹⁴ in the pattern-strip P. The function of these independent perforations, is to throw into or out of gear, the mechanism which advances the stereotype bar T. This mechanism will now be described.

In Figs. 5 and 6, S is a disk which is affixed to and revolves with the main shaft A, and is provided with a single tooth s, which once in each revolution engages with one of the four equidistant teeth of a star-wheel S⁰ affixed to a toothed wheel S¹. Said toothed-wheel S¹ engages with a pinion S² carrying a crank-pin S³, to which is attached a pitman S⁴. The proportions of the gear just described are such that the crank-pin S³ makes one complete revolution to each revolution of the main shaft A, but this revolution is performed during the brief period of time in which the tooth s is acting upon one of the four teeth of the star-wheel S⁰. The pitman S⁴ oscillates an arm S⁵, having its fulcrum upon a shaft or axis at S⁶, and its free extremity is jointed by a link S⁷ to a swinging arm S⁸, which has its fulcrum at S¹³, concentric with the axis of the ratchet-wheel $S^9$. This ratchet-wheel carries the pinion $S^{10}$ which advances the stereotype bar T. A curved hock-pawl $s^1$ is pivoted at $s^2$ to the arm $S^8$ and when in the position shown in Fig. 5, moves to-and-fro with the oscillations of the arm $S^8$, engaging with each successive tooth of the ratchet-wheel $S^9$, so that normally the said ratchet-wheel and stereotype-bar T would be advanced step-by-step by the successive oscillations of the arm $S^8$, any possible retrograde motion of the ratchet-wheel being meantime prevented by the click $s^7$.

Provision is made upon the pattern-strip for the advance of the stereotype bar T when required, by means of the special set of perforations. I have shown in Fig. 18 two rectangular perforations $A^{14}$ arranged in a transverse line $x^2$ $x^2$, at the point in the series of perforated lines where the post-office address is to be changed. These perforations permit the entrance of a pair of curved needles, one of which is seen at $S^6$ in Fig. 6. These needles are mounted upon a rock-shaft $s^5$ which carries an arm $s^4$ (Fig. 5) and this arm is attached by a connecting rod $s^3$ to the rear end of the hook-pawl $s^1$.

When the table M carrying the pattern-strip P is lifted, as hereinbefore described, the unperforated paper ordinarily lifts the needles $S^6$, thus throwing the hook-pawl $s^1$ out of engagement with the ratchet-wheel $S^9$ and preventing the advance of the stereotype bar T. The occurrence of the proper perforations in the pattern-strip P and perforations $S^{16}$ in the table M causes the needles to remain unmoved; the hook-pawl $s^1$ is not thrown out of engagement, and hence the stereotype-bar T is advanced one step, thus presenting a new line of type, which remains in position until occasion arises for another change.

The mechanism by means of which the impression is taken upon the wrapper-strip from the several sets of type will next be described.

The rolls $B^2$ and $B^4$, around which the wrapper-strip B is made to pass, are eccentrically mounted upon oscillating arms $U^2$ and $U^3$, as best seen in Figs. 3 and 4. These arms are mechanically connected together, and are oscillated simultaneously at proper times by a bar $U^1$, which receives its motion from a rocker arm U, fixed upon the shaft $S^6$ of the mechanism hereinbefore described, by which the stereotype bar T is caused to advance. The eccentric movement of the rolls $B^2$ and $B^4$ brings the wrapper-strip B forcibly in contact with the two lines of assembled type, thus imprinting the required words upon the wrapper. This lateral movement of the rolls $B^2$, $B^4$, for the purpose of making the impression, is only a very slight movement, and the gear $a^4$ and pinion $a^5$, (see Fig. 2) are in practice allowed to separate and close together sufficiently for this purpose, without interfering with their efficiency in revolving the roll $B^2$. On each side of each roll or platen $B^2$ and $B^4$ are placed stationary inking-rolls $u$ $u$ $u$ $u$ (see Figs. 6 and 7) which revolve in contact with the faces of the type upon the carriers, as the type are being assembled and distributed. The construction of these inking-rolls is shown in detail in Figs. 16 and 17, each roll being composed of as many annular disks of felt, or other equivalent porous or absorbent material, as there are separate type-carriers. Each disk of felt $u^2$ is mounted upon a flanged thimble $u^3$ after which an additional flange is slipped on (shown separately at $u^4$) and the requisite number of disks are then assembled together upon the shafts $u^1$, $u^1$, $u^1$, $u^1$.

The platen $V^7$ (Figs. 3, 4 and 6) which takes the impression from the stereotype bar T, is separate from that last described, and receives its motion independently from the main shaft A, by means of a bell-crank $V^5$, having its fulcrum at $V^6$ and actuated through the rod $V^4$, by an eccentric $V^8$ upon the shaft $V^2$. This shaft is made to perform an intermittent revolution by its attached pinion $V^3$ (Fig. 5), which is driven by a toothed wheel $V^9$ and a star-wheel $V^1$ with four teeth (shown in dotted lines) which engages with the single tooth $s$ upon the disk S, fixed to, and revolving with the main shaft A.

The entire machine is so designed that the strip B is made to move through the machine, during the time occupied by each complete revolution of the main shaft A, a distance equal to the required length of one wrapper, and during this operation the three lines of type constituting the address are imprinted upon a particular portion of the wrapper, and necessarily in close proximity to each other. Hence the wrapper-strip does not advance continuously, but intermittently, pausing three times, in the course of its travel, during each of which pauses, one line of the address is imprinted upon it. Thus, referring now to Fig. 4, it will be understood that during the first pause, the stereotype line denoting the post-office and State is imprinted by the platen $V^7$, the wrapper-strip then suddenly moves forward until the line so printed has passed a little beyond the impression point upon the roll or platen $B^4$, when it pauses and receives the impression of the line of assembled type upon the carriers I, denoting the name, after which it suddenly moves forward again, passing meantime around the roll $B^3$ and pauses in the proper position for the impression of the other line of assembled type upon the carriers J to be imprinted just between the two previously printed lines. The mechanism by which this intermittent advance movement is imparted to the wrapper-strip, acts through the feed-rolls B¹ B², has heretofore been described, and needs no further explanation. In printing the address in this manner, it is necessary that the name-line of one address and the location-line of the succeeding address, should be simultaneously printed by the two lines of assembled type, and hence the distance apart upon the wrapper strip of these two lines, when printed, should be about equal to the length of one wrapper. It is for this reason, that is, to give these two lines of the address their desired relative position, that the wrapper-strip is made to pass around the intermediate roll B³ after printing the location-line of one wrapper, and before printing the name-line of the next wrapper. To provide for desired variations of the relative positions of these lines respectively the roll B³ is adjustably mounted upon a slotted standard, secured in the required position by a screw $b$.

The stereotype-bar T is so adjusted that its successive impressions will fall into their proper places, in reference to the lines subsequently printed in connection therewith by the type-carriers I and J.

The mechanism for inking the stereotype lines preparatory to printing therefrom, is best seen in Fig. 4. An ink-roll T² is carried upon the upper end of a pair of rods T³ which are guided by pins T⁴, working in curved slots T⁵ in the frame of the machine, the rods being attached to a pair of cranks T⁶ and T⁷ upon roll P². At the proper time—that is to say, directly after each impression has been taken—the rod T³ suddenly descends, carrying with it the ink-roll T², which is so guided by the curved slot T⁵ as to be brought momentarily into contact with the faces of the letters upon the stereotype-bar T, thus inking them in readiness for the next impression. This position of the ink-roll is indicated by the dotted lines in Fig. 4.

The side-frames or plates of the machine, which support the various moving parts which have been described, are secured to each other and maintained in their proper relative positions by transverse rods T¹⁰ T¹¹ and T¹² seen in Figs. 1, 2, 3 and 4.

As each of the parts of the machine which have been herein described, receive positive motion through the necessary intermediate mechanism from one and the same power-driven main shaft, it follows that all said movements must necessarily be performed in a coöperative time relation to each other, the whole being so arranged that one pamphlet is addressed, rolled, wrapped, flatted and ejected, during each complete revolution of said main shaft.

I do not desire to confine myself to the precise mechanical construction of the parts of my apparatus hereinbefore described, as these may obviously be varied in many particulars without departing from the spirit of my invention.

By the term type-member as used in certain of the claims, is to be understood the type-wheel or annular member J together with the arm I² with the slide I³ thereon, together with the parts connecting the arm and the type-wheel.

I claim as my invention:—

1. The combination of the main shaft, the wrapper feed-rolls, the trough for containing pamphlets, the chute, the movable fingers for feeding said pamphlets one by one into said chute, and intermediate mechanism actuated from said main shaft by partial gears for communicating intermittent progressive motion to said feed-rolls and to said fingers.

2. The combination of the main shaft, the trough for containing pamphlets, the chute, the partial gears, the slotted swinging arm and pin for communicating to and fro motion from said partial gears to movable fingers for feeding said pamphlets one by one into said chute, and the intermediate differential mechanism for multiplying said to and fro motion.

3. The combination of the main shaft, the wrapper feed-rolls, the chute, the movable fingers for feeding the pamphlets into said chute, the rolling-clamps for coiling the pamphlet and wrapper into a volute, the partial gears for communicating intermittent progressive motion from said shaft to said feed-rolls; mechanism for transmitting to and fro motion from said main shaft to said fingers, and partial gears for communicating intermittent progressive rotary motion from said main shaft to said rolling-clamps.

4. The combination of the main shaft, the rolling-clamps, the movable jaws mounted within said rolling-clamps, the longitudinally sliding bolts and links for opening and closing said jaws, and the cam-wheel on the main shaft for actuating said bolts and links.

5. In a rolling clamp the combination of a cylinder revoluble within its support; a longitudinally projecting jaw inserted therein and pivoted at one end to the body of the rolling clamp; a longitudinally movable bolt concentric with the cylinder; the link connection pivoted at one end to said bolt, and at the other end to the inserted jaw, near the middle portion of the same, and means for intermittently revolving the cylinder and sliding said bolt with reference thereto, substantially as described.

6. The combination of the main shaft, the oscillating frame, the flatting-rolls mounted thereupon, and mechanism substantially such as described, whereby rotary motion in a given direction is imparted to one of said flatting-rolls by the oscillatory movement of said frame irrespective of its direction.

7. The combination of the main shaft, the rolling-clamps provided with movable clamping jaws, the oscillating frame, the flatting-rolls mounted upon said frame, and mechanism, substantially such as described, for communicating motion from said main shaft to said clamps and said frame, whereby said clamps are opened and withdrawn coincidently with the arrival of said flatting-rolls near or at the extremity of their oscillation, and when they are in proximity to said clamps.

8. The combination of the main shaft, the oscillating frame, the flatting-rolls mounted thereon, the stationary segmental toothed racks, the pinion for driving said rolls and the ratchet pinions, respectively engaging with said racks and alternately imparting progressive rotation in one direction to said driving pinion and rolls.

9. The combination of a type carrier provided with a series of characters equidistantly disposed throughout a portion of its circumference; a series of steps corresponding in radial position with groups of the characters; a swinging arm mounted concentrically with said carriers; a slide mounted for radial movement in said arm; a selector adapted to control the radial position of the said slide, and an auxiliary selector provided with a series of shoulders to stop the swinging movement of said arm, each of the selectors being provided with a series of differential contact points and a perforated pattern strip to raise the selectors to different vertical positions, for the purpose of stopping or arresting the type carrier at a pre-determined point in its rotation.

10. The combination of a type-carrier provided with a series of characters and a series of spirally disposed steps; an intermediate, duplex, swinging member, mounted upon, concentric with, and actuated by the type-carrier, and adapted to co-act with any desired step of the series upon said type-carrier; a pair of selectors adapted to control and limit the movements of the duplex intermediate member, and to be controlled by a perforated pattern-strip, whereby a selected stopping position of the type-carrier with reference to the printing point is effected.

11. The combination of a type carrier provided with a series of characters, and with a series of steps; a perforated pattern-strip adapted to control independently a pair of stepped selectors, and an intermediate swinging member provided with a radially movable slide, the swinging member and the slide both being controlled by the selectors, and in turn controlling the final position of the type carrier.

12. The combination of a type carrier provided with a series of characters and with a series of spirally-disposed steps; a perforated pattern-strip; a pair of stepped selectors adapted to be controlled by the pattern-strip; a swinging member intermediate the type carrier and one of the selectors, the swinging member being provided with a radially moving slide, intermediate the series of spirally-disposed steps, and the other selector, to arrest the type carrier in a predetermined position.

13. The combination of a type carrier provided with a series of characters and a series of spirally-disposed steps, the steps representing equal groups of the characters; a swinging member mounted concentrically with the type carrier and adapted to swing to about the extent of one step; a radially movable slide, mounted in the outer part of said swinging member, the inner end of this slide being in position and adapted to intercept any desired step of the series; a selector having a curved upper surface and adapted to sustain the slide at a suitable height to intercept any desired step of the type carrier; another selector provided with a series of shoulders and adapted to intercept the swinging member at any desired character position in the selected group, the pair of selectors being provided each with a series of stepped contact faces adapted to be controlled by a perforated pattern-strip.

14. The combination of a plurality of independently operable type carriers in adjacent parallel planes, each provided with a series of characters, a similar number of pairs of co-acting selectors, a similar number of swinging members provided with slides intermediate of each type carrier and its corresponding pair of selectors; and a perforated pattern-strip adapted to control the several pairs of selectors, to cause the selection of a line of significant characters, substantially as described.

15. The combination of a plurality of type carriers, each provided with a series of characters; a plurality of duplex intermediate intercepters; a plurality of pairs of selectors, each pair of which separately or conjointly controls a member of the intermediate device, which determines the position of its corresponding type carrier with reference to a printing point; and an intermittently presented pattern-strip provided with a group of perforations for each of the selectors whereby the operation of said selectors is effected.

16. The combination with a plurality of type-carriers each having characters arranged in like series, the series of each respectively being composed of a number of groups, and each type-carrier being provided with a series of spirally-disposed steps, and each step corresponding in angular position to one of the groups of type; and a corresponding number of pairs of pattern control selectors; intermediate means between each type-carrier and one of its corresponding selectors, by means of which the selector designates and secures the group in which is a desired character; also an intermediate means between the type-carrier and its other corresponding selector, by means of which a particular character in the selected group is designated and secured.

17. The combination of a plurality of type-carriers, each provided with a series of characters and with a series of spirally-disposed steps, a corresponding number of pairs of selectors, a corresponding number of duplex intermediate intercepters, and an intermittently presented pattern-strip provided with a corresponding number of pairs of groups of perforations engaging simultaneously and independently with the said selectors to control the respective stopping positions of the said type-carriers with reference to a common line of assemblage.

18. The combination of a plurality of adjacent type-carriers, each bearing a similar series of significant characters; a shaft from which said carriers receive their motion, means substantially as described for causing said shaft and carriers to move alternately in opposite directions; a bar $m^9$ limiting the movement of each of said carriers at a common or zero point in one direction, and movable slides $I^3$, one for each carrier to engage with said carrier and with pattern-controlled selectors to limit the movement of the carrier at any required point during its movement in the opposite direction.

19. The combination of a movable type-carrier capable of being placed in a predetermined number of different angular positions, which number is such as to be capable of mathematical subdivision into two or more groups, each of which groups shall contain a number of equal sub-divisions, with a bar limiting its movement in one direction, and two independently movable co-acting selectors controlling or limiting its movement in the opposite direction, one of which selectors determines the number of groups of positions to be passed over in the movement of the carrier away from the limit bar, while the other determines the number of subdivisions of a group to be passed over beyond the last integral group.

20. The combination of a movable type-carrier capable of being placed in a predetermined number of different angular positions, which number is such as to be capable of mathematical subdivision into two or more groups, each of which groups shall contain an equal number of subdivisions, with a fixed bar limiting its movement in one direction and two independently movable selectors controlling or limiting its movement in the opposite direction through means of a duplex intercepter, a pattern-strip containing two groups of characters and adapted for independent control of each of said movable selectors by the respective groups of characters in the pattern-strip.

21. The combination of a rotatable type-carrier provided with a series of characters, a radial arm mounted upon and having a motion of rotation imparted to it by said type-carrier, a slide movable to-and-fro in a radial direction upon said arm, and a series of shoulders upon said type carrier, differing in position from each other by equal increments both of angular and of radial distance, said type-carriers thereby engaging said slide according to its radial position, and thereby determining the angular position of said type carrier with reference to said radial arm and slide, and a pair of selectors adapted to limit the positions of said arm and slide and to be controlled by a pattern-strip.

22. The combination of a rotatable type carrier provided with a series of characters, a radial arm attached to, and receiving motion of rotation from said type-carrier, a slide movable to-and-fro in a radial direction upon said arm, a series of shoulders upon said type-carrier differing in position from each other by equal increments both of angular and of radial distance, and engaging with said slide at different angular distances corresponding to its different radial positions, and a pattern-controlled selector, moving independently of the type-carrier and radial arm, by means of which the radial position of said radially moving slide is controlled.

23. The combination of a rotatable type-carrier provided with a series of characters, a radial arm attached to, and receiving a motion of rotation from, said type-carrier, a slide movable to-and-fro in a radial direction upon said arm, a series of shoulders upon said type-carrier, and engaging with said slide, to thereby determine the angular position of said type-carrier with reference to said radial arm and slide, and a set of pattern-controlled selectors movable independently of said type-carrier and radial arm, by means of which the angular position of said radial arm and type-carrier is controlled.

24. The combination of a type-carrier provided with a series of characters, and with a series of spirally disposed steps; swinging slide-carrying arm $I^2$; slide $I^3$; selectors K, and $K^1$; and the pattern-strip P.

25. The combination with the type-carrier having characters arranged in a series, and provided with a series of spirally disposed steps, and a pair of pattern-controlled selectors, one of which is provided with a series of shoulders; and intermediate means between the series of steps of the type-carrier and the shoulders of the selector, by means which the determination and presentation of any individual character at the impression point is secured.

26. The combination of a type-carrier provided with a series of characters and a series of spirally disposed steps representing equal groups of the characters, a pattern-controlled selector provided with a series of shoulders; a pattern-controlled selector being in position and adapted to control an intermediate member between the series of steps of the type-carrier and the series of shoulders of the selector, to arrest a type-carrier with any desired character at the impression point.

27. The combination of two or more selectors each provided with a series of supporting pins, arranged in cumulative steps, adapted to be controlled by a pattern-strip, perforated in such a manner as to permit any desired pin upon either of said selectors, to impinge and rest upon an unperforated portion of said pattern-strip; a type-carrier provided with a series of characters, and duplex means of connection from said selectors to said type-carrier.

28. The combination of a type-carrier provided with a series of type, a strip of paper having groups of perforations arranged in pairs, a pair of selectors controlled by the paper, one selector controlling a swinging member mounted concentrically with the type-carrier, and the other selector controlling a radially movable slide mounted in the swinging member for the purpose of arresting the type carrier at predetermined points in its rotation.

29. The combination of a plurality of type-carriers frictionally mounted in parallel planes of rotation upon a common axis; mechanism for rotating said axis alternately in opposite directions; a fixed bar or stop limiting the motion of said type carriers in one direction at a common or zero point; a plurality of pairs of selectors controlled by a perforated pattern-strip, and a plurality of intermediate members co-acting with the selectors and the type-carriers, to limit the movement of the said respective type-carriers in the other direction at different points.

30. The combination of a plurality of type-carriers, frictionally mounted in parallel planes of rotation upon a common axis; mechanism for rotating said axis alternately in opposite directions; a common fixed stop, limiting the motion of said type-carriers in one direction, at a common or zero point; a like series of oscillating and radially sliding intercepters; and a like series of pairs of cumulative stepped selectors, one adapted to limit the oscillatory movement of the intercepter, and the other to control the radial movement of the intercepter, to limit the movement of the said respective type-carriers in the other direction at different points.

31. The combination with a plurality of type-carriers, mounted upon a shaft in adjacent parallel planes of rotation, of a corresponding number of inking-rolls, consisting of annular disks of porous material mounted side by side upon independent double-flanged thimbles, and held in lateral contact with each other upon an axis parallel to the axis of the type-carriers.

32. The combination of a plurality of type-carriers, frictionally mounted in parallel planes of rotation upon a common axis; mechanism for rotating said axis alternately in opposite directions; a fixed bar or stop limiting the motion of said type-carriers at a common or zero point; a plurality of pairs of selectors, one of each pair being stepped, and connecting members between said type-carriers and said pairs of selectors, to limit the movement of said type-carriers in the opposite direction at different points; and a pattern-strip for controlling the movement of said selectors.

33. The combination of the type-carriers, the radial arms mounted concentrically with and receiving motion from said type-carriers, the slides movable to-and-fro in a radial direction upon said arms, and engaging with a series of spirally arranged shoulders upon said type-carriers, the pattern-controlled selectors to control said arms and slides, and an independent bar engaging with said slides as a group and acting to simultaneously move them out of engagement with said shoulders.

34. The combination of a pattern-strip for character selection having, a plurality of cumulatively arranged rows or groups of perforations, each row or group operating an independent selector; a type-carrier provided with a series of characters arranged in successive groups, duplex intermediate means between the said type-carrier and a pair of the pattern-controlled selectors, whereby one group of the perforations in the pattern-strip causes a selection of the desired group of characters upon the type-carrier, and the co-acting group of perforations in the pattern-strip causes the selection of a desired character in the group of type designated by the other selector.

35. The combination of a pattern-strip for character selection having, a plurality of cumulatively-arranged rows or groups of perforations, each row or group operating independent selectors, a type-carrier provided with a series of characters arranged in successive groups; intermediate means between the pair of selectors and their corresponding type-carrier, whereby one group in the pattern-strip causes a selection of a particular group of characters upon the type-carrier, and the other of said groups in the pattern-strip causes a selection of an individual character of the group designated by the other selector.

36. The combination of a pattern-strip provided with perforations arranged in a plurality of pairs of progressive rows or groups; a corresponding plurality of pairs of selectors; a plurality of type-carriers, each provided with a like series of characters; and a like plurality of swinging duplex intermediate interceptory members between the type-carriers and their corresponding pairs of selectors, in position and adapted to arrest the several type-carriers so as to form a line of type of any desired arrangement under control of the pattern-strip.

37. The combination of a pattern-strip provided with perforations arranged in a plurality of pairs of progressive rows or groups, with a corresponding number of pairs of stepped or cumulative selectors; a like plurality of type-carriers, each having a series of characters, and intermediate intercepters between said selectors and said type-carriers.

38. The combination of an arbitrarily perforated pattern-strip, a perforated table for lifting the same, and two selectors, each having supporting pins of different lengths, which by entering said perforations determine the distance through which said selectors are simultaneously and respectively moved; a type-carrier provided with a series of characters, and intermediate intercepting means between said selectors and said type-carrier.

39. The combination of a bar having a plurality of lines of stereotyped matter affixed thereto, mechanism for removing said bar step-by-step so as to bring each line of type thereon successively into operative relation with a platen, and mechanism automatically controlled by a pattern-strip, whereby the mechanism for moving said bar is thrown into or out of mechanical connection with its driving shaft at proper intervals.

40. The combination of a perforated pattern-strip, a perforated table for lifting the same; a sprocket-roller for controlling the position of said pattern-strip with reference to said table; a continuously rotating main shaft, and mechanism substantially as described, whereby an intermittent progressive motion is communicated to said sprocket-roller and pattern-strip, and in alternation therewith, a to-and-fro motion to said table in a direction perpendicular to the plane of said pattern-strip, and a pair of selectors, a type-carrier provided with a series of characters and intermediate interceptory means between said type-carrier and said selectors.

41. The combination of a pattern-strip having a plurality of groups of arbitrarily arranged perforations, a like plurality of pairs of selectors, a like plurality of type-carriers, each having a series of characters, a concentrically-mounted duplex intermediate-interceptory means between each of the type-carriers and the corresponding pattern-controlled selectors, in position for and adapted to control the assemblage of the characters of the respective type-carriers into words and sentences.

42. The combination of a perforated pattern-strip, a pair of selectors adapted to be controlled by the groups of perforations in the pattern-strip, one of the selectors being provided with a series of shoulders; a type-carrier provided with a series of characters and a series of steps; a swinging arm mounted concentrically upon said type-carrier and provided with a radially movable slide adapted to coöperate with any desired step of the series, and a swinging arm, being in position and adapted to be intercepted by any shoulder of the series upon the selector, substantially as described.

43. The combination of a movable type-member, a shiftable selector, said two members being organized to cause the movement of the type-member to be arrested by the engagement thereof with a selector to bring different type to a printing position according to different positions of the selector, and a support for a pattern strip, the selector being organized to coöperate with a pattern strip on the support to control the various positions of the selector for engagement with the type-member.

44. The combination of a movable type-member, a shiftable selector, said two members being organized to cause the movement of the type-member to be arrested by the engagement with the selector to bring different type to a printing position, according to different positions of the selector, and a support for a pattern strip, the selector having stepped portions organized to coöperate with a pattern strip on the support to control the position of the selector for engagement with the type-member.

45. The combination of a movable type-member, a shiftable selector, said two members being organized to cause the movement of the type-member to be arrested by the engagement with the selector to bring different type to a printing position according to different positions of the selector, and a support for a pattern strip movable to engage the selector, the selector having stepped portions organized to coöperate with a pattern strip on the support when advanced thereby to vary the position of the selector for engagement with the type-member.

46. The combination of a movable type-member, a shiftable selector, said two members being organized to cause the movement of the type-carrier to be arrested by the engagement with the selector to bring different type to a printing position, according to different positions of the selector, and a support for a pattern strip movable to engage the selector, the selector having pins with stepped ends organized to coöperate with a pattern strip on the support when advanced thereby to control the position of the selector for engagement with the type-member.

47. The combination of a pivoted type-member, a shiftable selector, said two members being organized to cause the movement of the type-member to be arrested by the engagement with the selector to bring different type to a printing position, according to different positions of the selector, and a support for a pattern strip movable to engage the selector, the selector having pins with stepped ends organized to coöperate with a pattern strip on the support when advanced thereby to control the position of the selector for engagement with the type-member.

48. The combination of a pivotally mounted type-member, a shiftable selector arranged to arrest the type-member in different positions according to its different positions, the selector having a series of stepped portions arranged to be engaged by a pattern strip having openings therein variously disposed, and a support for the pattern strip movable to bring the pattern strip to engage the stepped portions of the selector at its said openings and advance the selector different distances depending on the openings in the pattern strip.

49. The combination of a pivotally mounted type-member, a shiftable selector arranged to arrest the type-member in different positions according to its different positions, the selector having a series of stepped pins arranged to be engaged by a strip having openings therein variously disposed to engage its stepped portions, a support for the pattern strip, and means for moving the support between fixed limits to cause the pattern strip to engage the pins of the selector at its said openings and advance the selector different distances depending on the openings in the pattern strip.

50. The combination of a pair of selectors, each provided with pins whose ends are arranged in cumulative steps for engagement with a perforated pattern strip to be advanced thereby different distances according to the engagement of the pins with the strip, a type-carrier, and connections organized to coöperate between both selectors and the type-carrier to position the respective type according to the engagement of the pins with the perforated strip.

51. The combination of a pair of selectors each provided with pins whose ends are of progressive lengths, a pattern strip containing openings arranged to be engaged by said pins to position the selectors, a type-carrier, and connections organized to coöperate with the selectors and the type-carrier to position the carrier according to the engagement of the selectors by the pattern strip.

52. The combination of an apertured pattern strip, an apertured table for supporting the strip, and a selector having supporting pins of varying lengths arranged to enter certain of the openings in the table and strip whereby the selectors are positioned by movement of the table, a type-carrier and intermediate intercepting means between the selector and the type-carrier.

53. An addressing machine comprising a plurality of printing surfaces, a rock arm operatively connected with each printing surface, means for simultaneously oscillating said rock arms, and means for automatically and independently varying the length of the arc through which each rock arm moves to correspondingly vary the printing positions of said printing surfaces.

54. An addressing machine comprising a plurality of printing surfaces, a rock arm operatively connected with each printing surface, means for simultaneously oscillating said rock arms, and adjustable means for automatically and independently varying the length of the arc through which each rock arm moves to correspondingly vary the printing positions of said printing surfaces.

55. An addressing machine comprising a plurality of printing surfaces, a rock arm operatively connected with each printing surface, means for simultaneously oscillating all of said rock arms, and selector means for automatically and independently varying the length of the arc through which each rock arm moves to correspondingly vary the printing positions of said printing surfaces.

56. An addressing machine comprising a plurality of disks each provided with a curved printing surface, a rock arm operatively connected with each disk, means for simultaneously oscillating said rock arms, and means for automatically and independently varying the length of the arc through which each rock arm moves to correspondingly vary the printing positions of said disks.

57. An addressing machine comprising a plurality of printing surfaces, a rock arm operatively connected with each printing surface, means for simultaneously oscillating said rock arms, selector means for automatically and independently varying the length of the arc through which each rock arm moves to correspondingly vary the printing positions of said printing surfaces, and means for automatically operating the selector means.

58. An addressing machine comprising a plurality of oscillating printing surfaces, a plurality of stop plates, one for each printing surface, each stop plate being provided with means for varying the position at which its respective printing surface is stopped, and means for varying the operative positions of said stop plates.

59. An addressing machine comprising a plurality of movable printing surfaces, and a single stop for each printing surface, each stop being provided with means for varying the position at which its respective printing surface is stopped.

60. An improvement in addressing machines comprising a plurality of oscillating printing surfaces, a plurality of stops, one for each surface, to limit the oscillation of the latter, means for successively varying the position of each stop, and means for returning said printing surfaces to normal position after the printing operation.

61. An improvement in addressing machines comprising a plurality of oscillating printing surfaces, stops for limiting the oscillation of said printing surfaces, and means for feeding selector devices under said stops, each stop being provided with means whereby its successive positions may be varied.

62. An addressing machine comprising a plurality of curved printing surfaces, means for simultaneously oscillating said printing surfaces, means for automatically and independently varying the length of the arc through which each printing surface oscillates, and means for presenting a color vehicle in position to transfer impressions from said printing surfaces.

In testimony whereof, I have hereunto subscribed my name this fourth day of October, A. D. 1892.

WALTER ELIPHALET CRANE.

Witnesses:
   F. H. ALLING,
   E. RISLEY.